(12) United States Patent
Choi et al.

(10) Patent No.: US 9,258,807 B2
(45) Date of Patent: Feb. 9, 2016

(54) COMMUNICATION NETWORK DEVICE, COMMUNICATION TERMINAL, AND COMMUNICATION RESOURCE ALLOCATION METHODS

(75) Inventors: Hyung-Nam Choi, Hamburg (DE); Maik Bienas, Braunschweig (DE); Achim Luft, Braunschweig (DE); Andreas Schmidt, Braunschweig (DE)

(73) Assignee: Intel Deutschland GmbH, Neubiberg (DE)

( * ) Notice: Subject to any disclaimer, the term of this patent is extended or adjusted under 35 U.S.C. 154(b) by 1014 days.

(21) Appl. No.: 12/772,269

(22) Filed: May 3, 2010

(65) Prior Publication Data

US 2011/0268046 A1 Nov. 3, 2011

(51) Int. Cl.
*H04W 72/04* (2009.01)
*H04W 88/08* (2009.01)
(Continued)

(52) U.S. Cl.
CPC .......... *H04W 72/042* (2013.01); *H04L 5/0007* (2013.01); *H04L 5/0053* (2013.01); *H04L 5/0094* (2013.01); *H04W 72/0453* (2013.01)

(58) Field of Classification Search
CPC ...... H04W 72/04; H04W 88/08; H04W 76/00
See application file for complete search history.

(56) References Cited

U.S. PATENT DOCUMENTS 4,161,277 A * 7/1979 Steiner .................. G03G 15/55
399/16
8,451,770 B2 * 5/2013 Chen et al. ..................... 370/321
(Continued)

FOREIGN PATENT DOCUMENTS

CN 101132229 A 2/2008
CN 101582873 A 11/2009
(Continued)

OTHER PUBLICATIONS

3GPP TS 36.211, V8.6.0 (Mar. 2009), 3rd Generation Partnership Project; Technical Specification Group Radio Access Network; Evolved Universal Terrestrial Radio Access (E-UTRA); Physical Channels and Modulation (Release 8); pp. 1-83.
(Continued)

*Primary Examiner* — Hassan Phillips
*Assistant Examiner* — Prenell Jones
(74) *Attorney, Agent, or Firm* — Schwabe, Williamson & Wyatt, P.C.

(57) ABSTRACT

A communication network device of a communication system is described comprising a transmitter configured to transmit data in a plurality of frames, wherein in each frame, a plurality of communication resource elements is provided to be allocated for data transmission of downlink control data, wherein a data communication resource element is defined by a frequency range and a communication time interval within the frame and a communication resource allocator configured to allocate a first set of the communication resource elements of the plurality of communication resource elements provided to be allocated for data reception of downlink control data in a frame for the transmission of the downlink control data and to allocate a second set of the communication resource elements of the plurality of communication resource elements provided to be allocated for data reception of downlink control data in the frame that have not been allocated for the transmission of downlink control data for the transmission of data of another type than the downlink control data.

21 Claims, 14 Drawing Sheets

(51) Int. Cl.
*H04W 76/00* (2009.01)
*H04L 5/00* (2006.01)

(56) References Cited

U.S. PATENT DOCUMENTS

| | | | |
|---|---|---|---|
| 8,477,675 B2* | 7/2013 | Cai et al. | 370/312 |
| 8,576,844 B1* | 11/2013 | Ghosh | H04L 12/462 370/390 |
| 8,743,823 B2* | 6/2014 | Richardson et al. | 370/330 |
| 2003/0169723 A1 | 9/2003 | Diachina et al. | |
| 2007/0280236 A1* | 12/2007 | Yang | H04L 12/185 370/390 |
| 2008/0089281 A1 | 4/2008 | Yoon et al. | |
| 2009/0088148 A1 | 4/2009 | Chung et al. | |
| 2009/0197542 A1 | 8/2009 | Buckley et al. | |
| 2010/0002702 A1* | 1/2010 | Saito | H04L 45/18 370/392 |
| 2010/0120442 A1* | 5/2010 | Zhuang et al. | 455/450 |
| 2010/0165931 A1* | 7/2010 | Nimbalker et al. | 370/329 |
| 2010/0182903 A1* | 7/2010 | Palanki et al. | 370/225 |
| 2010/0246518 A1* | 9/2010 | Gheorghiu et al. | 370/329 |
| 2010/0260090 A1* | 10/2010 | Santhanam et al. | 370/312 |
| 2011/0007695 A1* | 1/2011 | Choi | H04L 5/0007 370/329 |
| 2011/0065446 A1* | 3/2011 | Mueck et al. | 455/452.2 |
| 2011/0098054 A1* | 4/2011 | Gorokhov et al. | 455/452.1 |
| 2011/0268085 A1* | 11/2011 | Barany et al. | 370/331 |
| 2012/0093065 A1* | 4/2012 | Golitschek Edler Von Elbwart et al. | 370/315 |
| 2012/0176961 A1* | 7/2012 | Horiuchi | H04L 5/0053 370/315 |
| 2012/0230238 A1* | 9/2012 | Dalsgaard et al. | 370/311 |
| 2012/0311101 A1* | 12/2012 | Chao | 709/219 |
| 2012/0317242 A1* | 12/2012 | Du et al. | 709/219 |
| 2013/0163486 A1* | 6/2013 | Nangia | H04L 1/1822 370/281 |

FOREIGN PATENT DOCUMENTS

| | | |
|---|---|---|
| WO | 2009116789 A1 | 9/2009 |
| WO | 2010011104 A1 | 1/2010 |
| WO | 2010013963 A2 | 2/2010 |
| WO | 2010016698 A2 | 2/2010 |

OTHER PUBLICATIONS

RP-080137, 3GPP TSG #39, Mar. 4-7, 2008, Puerto Vallarta, Mexico, Proposed SID on LTE-Advanced; pp. 1-5; NTT DoCoMo et al.

3GPP TS 36.913, V8.0.0 (Jun. 2008), 3rd Generation Partnership Project; Technical Specification Group Radio Access Network; Requirements for Further Advancements for E-UTRA (LTE-Advanced) (Release 8); pp. 1-14.

3GPP TR 36.814, V9.0.0 (Mar. 2010), 3rd Generation Partnership Project; Technical Specification Group Radio Access Network; Evolved Universal Terrestrial Radio Access (E-UTRA); Further advancements for E-UTRA physical layer aspects (Release 9); pp. 1-104.

3GPP TS 22 368, V10.0.0 (Mar. 2010), 3rd Generation Partnership Project; Technical Specification Group Services and System Aspects; Service requirements for Machine-Type Communications (MTC); Stage 1 (Release 10); pp. 1-25.

RP-090991, 3GPP TSG-RAN #45, Sep, 15-18, 2009, Sevilla, Spain; New SI proposal: RAN Improvements for Machine-type Communications; pp. 1-5, Huawei et al.

Chinese Patent Office; First Office Action in Chinese Patent Application No. 201110112645, issued Aug. 5, 2013; 38 pages, including English translation.

Chinese Patent Office; Second Office Action in Chinese Patent Application No. 201110112645, issued May 6, 2014; 31 pages, including English translation.

German Patent Office; Examination Report in German Patent Application No. DE102011002342.9, mailed Nov. 24, 2011; 12 pages.

* cited by examiner

COMMUNICATION NETWORK DEVICE, COMMUNICATION TERMINAL, AND COMMUNICATION RESOURCE ALLOCATION METHODS

BACKGROUND

Embodiments generally relate to a communication network device, a communication terminal, and communication resource allocation methods.

3GPP (3rd Generation Partnership Project) has introduced LTE (Long Term Evolution) into the Release 8 version of UMTS (Universal Mobile Telecommunications System) standards. With LTE, the UMTS air interface is further optimized for packet data transmission by improving the system capacity and the spectral efficiency.

A current topic in the 3GPP standardization fora is the further advancement of LTE (Long Term Evolution) in the Release 10 version of UMTS standards in terms of spectral efficiency, cell edge throughput, coverage and latency, also referred to as LTE-Advanced. One of the key characteristics of LTE-Advanced is the support of bandwidths >20 MHz and up to 100 MHz by spectrum aggregation, i.e. the bandwidth of an LTE-Advanced (LTE-A) radio cell is divided into a number of so-called component carriers (CC), wherein the bandwidth size of each component carrier is limited to a maximum of 20 MHz. Among others, the downlink control channels (PCFICH, PHICH, PDCCH) and the PDSCH are transmitted using such component carriers.

Efficient methods for allocating communication resources in such a configuration are desirable.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the embodiments. In the following description, various embodiments are described with reference to the following drawings, in which.

DESCRIPTION

The following detailed description refers to the accompanying drawings that show, by way of illustration, specific details and embodiments in which embodiments may be practiced. These embodiments are described in sufficient detail to enable those skilled in the art to practice the invention. Other embodiments may be utilized and structural, logical, and electrical changes may be made without departing from the scope of the invention. The various embodiments are not necessarily mutually exclusive, as some embodiments can be combined with one or more other embodiments to form new embodiments.

3GPP (3rd Generation Partnership Project) has introduced LTE (Long Term Evolution) into the Release 8 version of UMTS (Universal Mobile Telecommunications System) standards. With LTE the UMTS air interface is further optimized for packet data transmission by improving the system capacity and the spectral efficiency. Amongst others, the maximum net transmission rate is increased significantly, namely to 300 Mbps in the downlink transmission direction and to 75 Mbps in the uplink transmission direction. Further, LTE supports scalable bandwidths of 1.4, 3, 5, 10, 15, and 20 MHz and is based on the multiple access methods OFDMA/TDMA (orthogonal frequency division multiple access/time division multiple access) in downlink and SC-FDMA/TDMA (single carrier-frequency division multiple access/TDMA) in uplink. OFDMA/TDMA is a multicarrier multiple access method in which a subscriber is provided with a defined number of subcarriers in the frequency spectrum and a defined transmission time for the purpose of data transmission. The RF bandwidth capability of an LTE UE (user equipment) for transmission and reception has been set to 20 MHz. A physical resource block (PRB) is the baseline unit of allocation for the physical channels defined in LTE. A physical resource block includes a matrix of 12 subcarriers by 6 or 7 OFDMA/SC-FDMA symbols. A pair of one OFDMA/SC-FDMA symbol and one subcarrier is denoted as resource element (RE).

Figure 1:
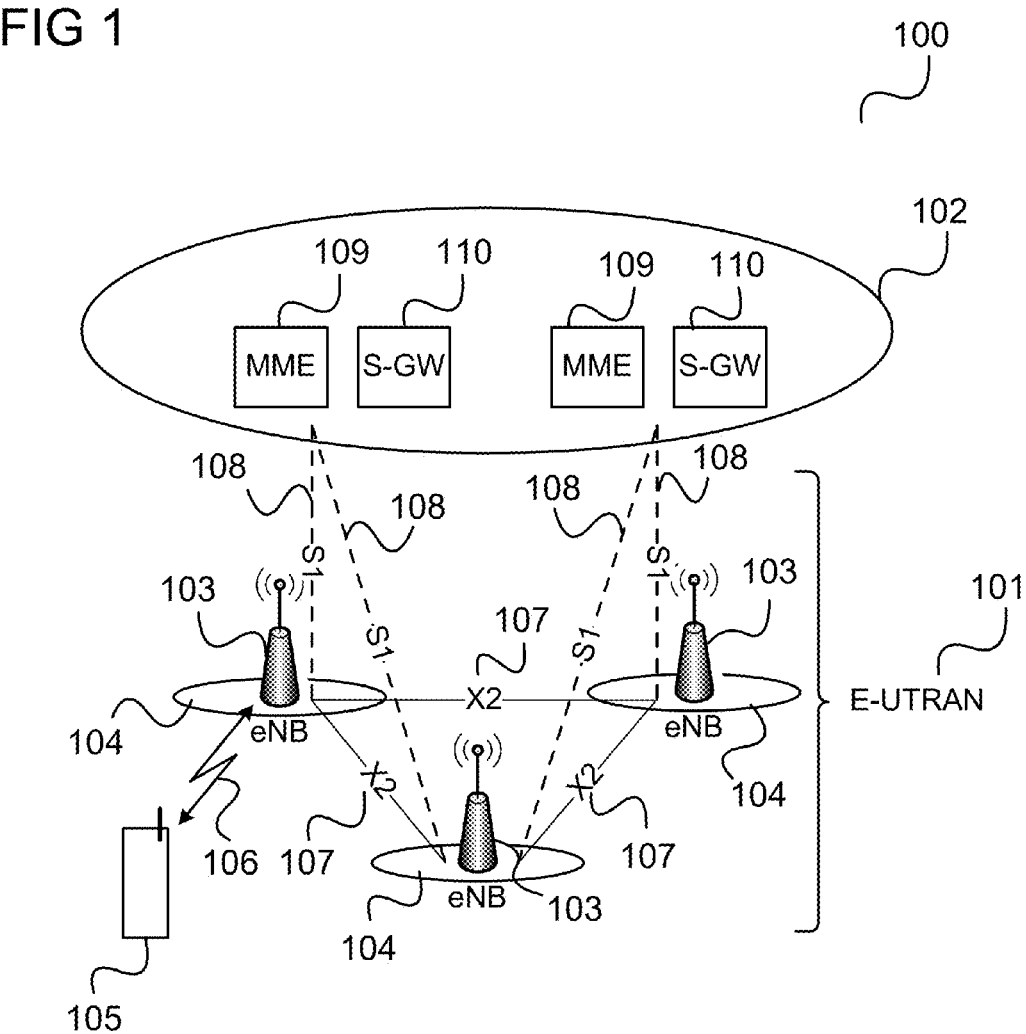
FIG. 1 shows a communication system according to an embodiment.

FIG. 1 shows a communication system 100 according to an embodiment.

According to this embodiment, the communication system 100 is configured in accordance with the network architecture of LTE. It is to be noted that in alternative embodiments, the communication system 100 may be configured in accordance with the network architecture of any other suitable telecommunication technology or standard, e.g. providing a multicarrier communication system providing e.g. data transmission in a plurality of frames, wherein in each frame, a plurality of communication resource elements is provided to be allocated for data transmission of downlink control data, wherein a data communication resource element is defined by a frequency range and a communication time interval within the frame. By way of example, in various embodiments, the communication system 100 may be configured in accordance with the network architecture of LTE Advanced.

The communication system includes a radio access network (E-UTRAN, Evolved UMTS Terrestrial Radio Access Network) 101 and a core network (EPC, Evolved Packet Core) 102. The E-UTRAN 101 may include base (transceiver) stations (eNodeBs, eNBs) 103. Each base station 103 provides radio coverage for one or more mobile radio cells 104 of the E-UTRAN 101.

A mobile terminal (UE, user equipment) 105 located in a mobile radio cell 104 may communicate with the core network 102 and with other mobile terminals 105 via the base station providing coverage (in other words operating) in the mobile radio cell.

Control and user data may be transmitted between a base station 103 and a mobile terminal located in the mobile radio cell 104 operated by the base station 103 over the air interface 106 on the basis of a multiple access method.

The base stations 103 may be interconnected with each other via e.g. a broadband interconnection, e.g. via a wireline interconnection, e.g. by means of a so-called X2 interface 107. The base stations may also be connected by means of the Si interface 108 to the core network (Evolved Packet Core) 102, more specifically to an MME (Mobility Management Entity) 109 and a Serving Gateway (S-GW) 110. The MME 109 is responsible for controlling the mobility of UEs located in the coverage area of E-UTRAN, while the S-GW 110 is responsible for handling the transmission of user data between mobile terminals 105 and core network 102.

In one embodiment, according to LTE, the communication system 100 may support the following types of duplexing methods: full-duplex FDD (frequency division duplexing), half-duplex FDD and TDD (time division duplexing). According to full-duplex FDD two separate frequency bands are used for uplink transmission (i.e. transmission from mobile terminal 105 to base station 103) and downlink transmission (i.e. transmission from base station 103 to mobile terminal 105) and both transmissions can occur simultaneously. According to half-duplex FDD also two separate frequency bands are used for uplink and downlink transmissions, but both transmissions are non-overlapping in time. According to TDD the same frequency band is used for transmission in both uplink and downlink. Within a time frame the direction of transmission may be switched alternatively between downlink and uplink.

Data transmission between the mobile terminal 105 and the corresponding base station 103 (i.e. the base station operating the mobile radio cell in which the mobile terminal 105 is located) is carried out in accordance with a (radio) frame structure. An example for a frame structure, denoted as frame structure type 1, is shown in FIG. 2.

Figure 2:
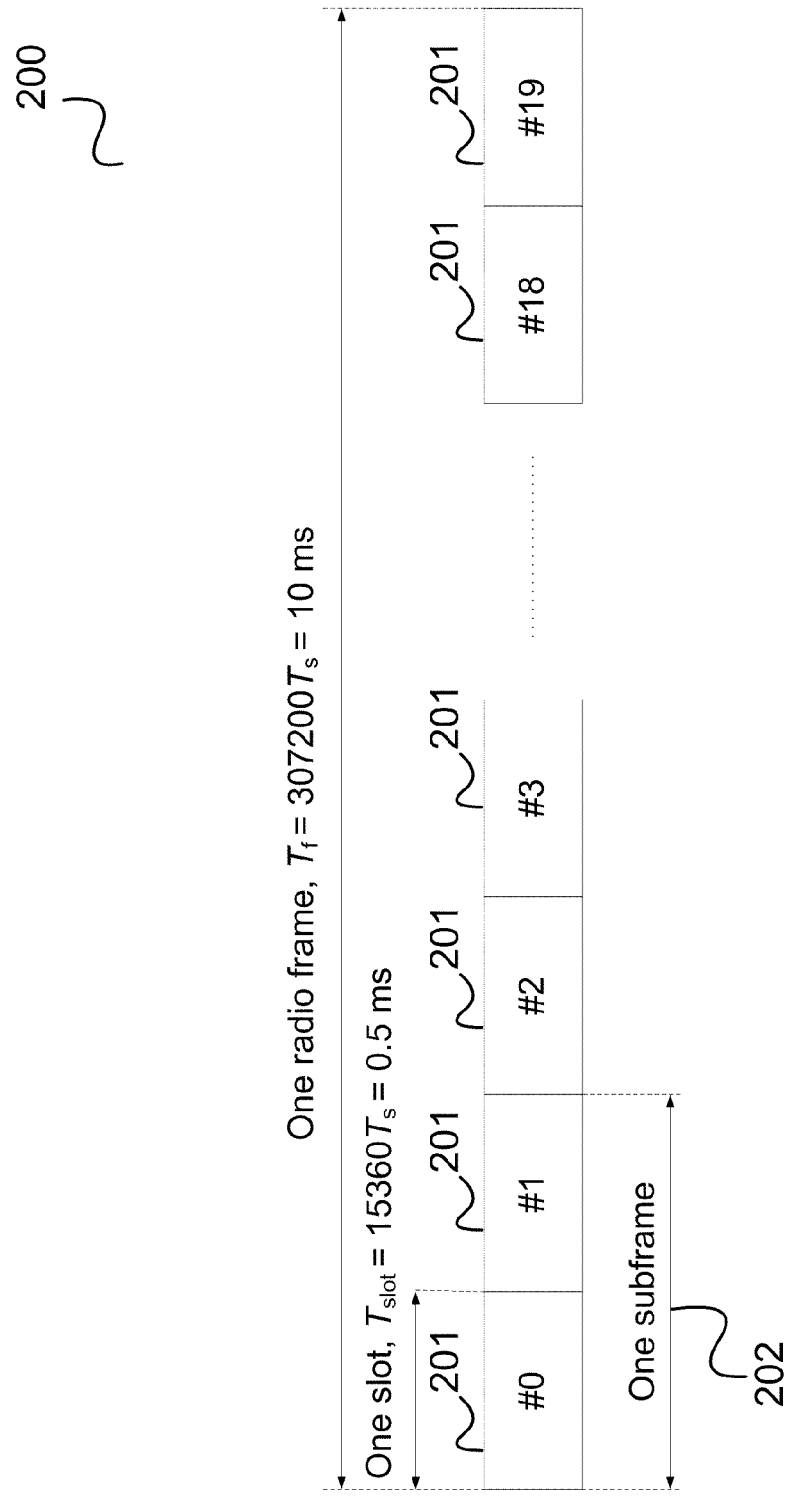
FIG. 2 shows a frame in accordance with an embodiment.

FIG. 2 shows a (radio communication) frame 200 in accordance with an embodiment.

The frame 200 may be used for both full-duplex and half-duplex FDD. The frame 200 may be 10 ms long and may consist of 20 slots 201 of length 0.5 ms, numbered from e.g. 0 to 19. A subframe 202 may be defined as two consecutive slots 201. In each 10 ms interval 10 subframes 202 are available for downlink transmissions or uplink transmissions. Uplink and downlink transmissions are separated in the frequency domain. Depending on the slot format a subframe 202 may include 14 or 12 OFDMA (orthogonal frequency division multiple access) symbols in DL (downlink) and 14 or 12 SC-FDMA symbols in UL (uplink), respectively.

According to one embodiment, according to LTE downlink and FDD mode, the following physical channels may be specified:

PDSCH:
Carries user and control data and paging messages in downlink.
Occupies the OFDMA symbols in a subframe not occupied by PDCCH.

PDCCH:
Downlink physical channel only, i.e. no logical and transport channels are mapped to this channel.
Carries the control information related to downlink/uplink transmissions such as resource assignments and HARQ information.
Occupies 1, 2, 3 or 4 OFDMA symbols in the first slot in a subframe. The number of symbols is adjusted by network and signalled on PCFICH.
QPSK (Quadrature Phase Shift Keying) is applied.

PCFICH:
Informs the UE about the number of OFDMA symbols used for the PDCCHs.
Occupies the first OFDMA symbol in the first slot in a subframe.
Is transmitted when the number of OFDMA symbols for PDCCH is greater than zero.

PHICH:
Carries Hybrid ARQ ACK/NACKs in response to uplink transmissions.
Occupies 1, 2, or 3 OFDMA symbols in the first slot in a subframe. The number of symbols is adjusted by network and signaled on PBCH.

PBCH: Carries system information to be broadcast in the radio cell such as downlink bandwidth information and number of OFDMA symbols assigned to PHICH.

In the LTE system as specified in the Release 8 version of UMTS standards, the transmission of the downlink control channels (PCFICH, PHICH, PDCCH), and the PDSCH for the FDD mode is organized as follows.

Figure 3:
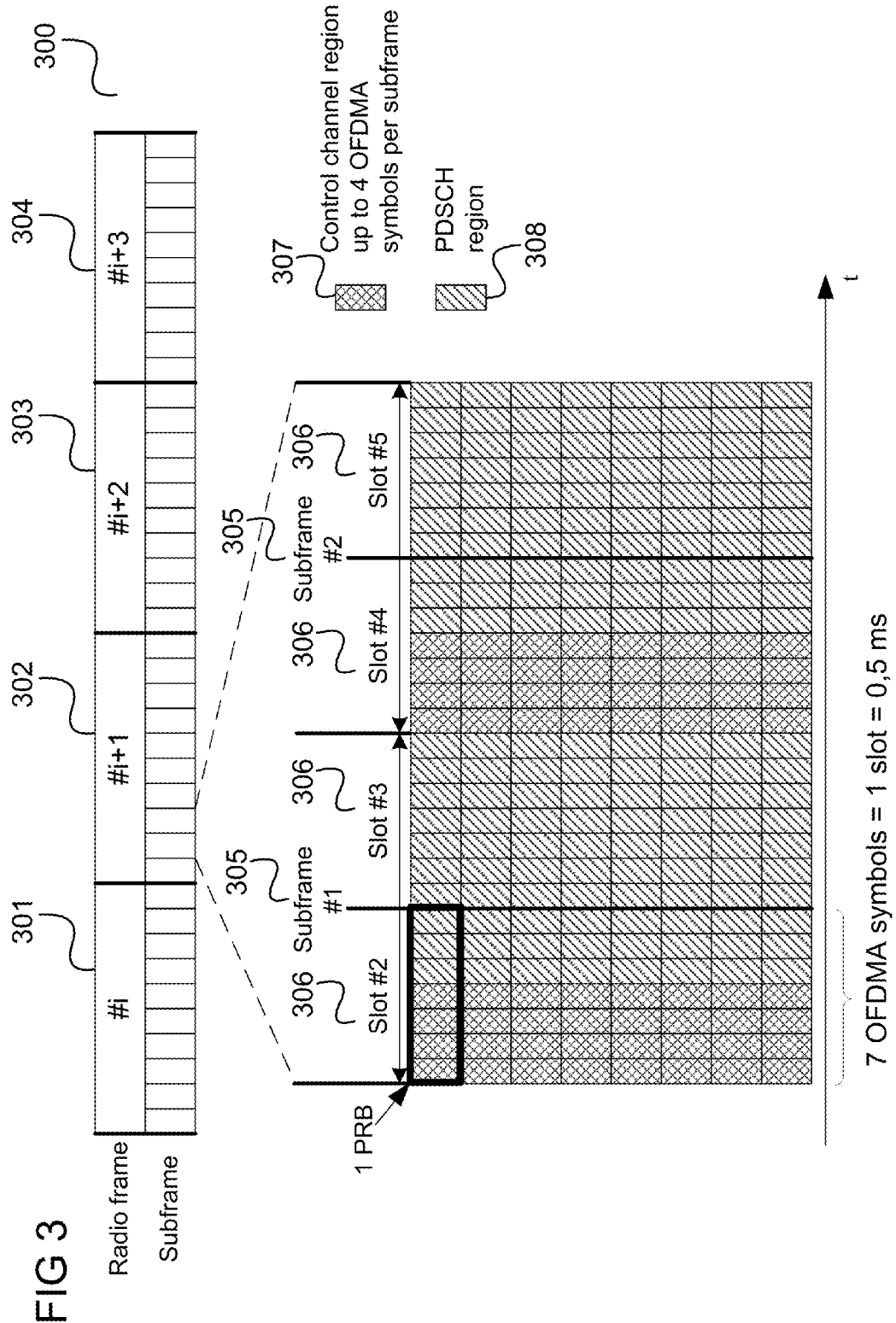
FIG. 3 shows an OFDMA symbol allocation according to one embodiment.

The transmission of the downlink control channels (PCFICH, PHICH, PDCCH), and the PDSCH for the FDD mode according to one embodiment is illustrated in FIG. 3.

FIG. 3 shows an OFDMA symbol allocation according to one embodiment.

Four radio frames 301, 302, 303, 304 are shown in FIG. 3, each having the structure as explained above with reference to FIG. 2, i.e. each including 10 subframes 305 wherein each subframe 305 includes two slots 306. In this implementation, each slot 306 may include 7 OFDMA symbols. A physical resource block (PRB) corresponds to 12 subcarriers of 7 (or alternatively 6) OFDMA symbols in this embodiment.

A subframe 305 of length 1 ms may be separated into a control channel region (as indicated by a first hatching 307) occupying a definite number of up to four OFDMA symbols. As an implementation, the case of four OFDMA symbols is indicated by the first hatching 307.

Further, each subframe 305 includes a PDSCH region (indicated by a second hatching 308) occupying the remaining OFDMA symbols.

The length of the control channel region and the PDSCH region is configurable by the radio access network 101. In the corresponding regions the downlink control channels and the PDSCH are mapped to resource elements (RE) in frequency-domain, wherein each resource element (also referred to as transmission resource element in the following) corresponds to a pair of one OFDMA symbol and one subcarrier. In FIG. 3, an example is depicted with a control channel region length of 4 OFDMA symbols and a PDSCH region length of 10 OFDMA symbols.

In more detail, the control channel region may be organized into so-called resource element groups (REGs) and the control channels PCFICH, PHICH and PDCCH are mapped to corresponding resource element groups. A resource element group may include or consist of a definite number of resource elements. The size of a resource element group may depend on the presence of the cell-specific reference signals (RS), i.e. in OFDMA symbols with RS the resource element group size is 6 resource elements (of which 2 resource elements are used for RS), otherwise 4 resource elements. Further, the number of available resource element groups may depend on the downlink bandwidth size as indicated in table 1.

TABLE 1

Number of REGs depending on bandwidth size

| Bandwidth [MHz] | Number of REGs in OFDMA symbols with RS | Number of REGs in OFDMA symbols without RS |
|---|---|---|
| 1.4 | 12 | 18 |
| 3 | 30 | 45 |
| 5 | 50 | 75 |
| 10 | 100 | 150 |
| 15 | 150 | 225 |
| 20 | 200 | 300 |

Figure 4:
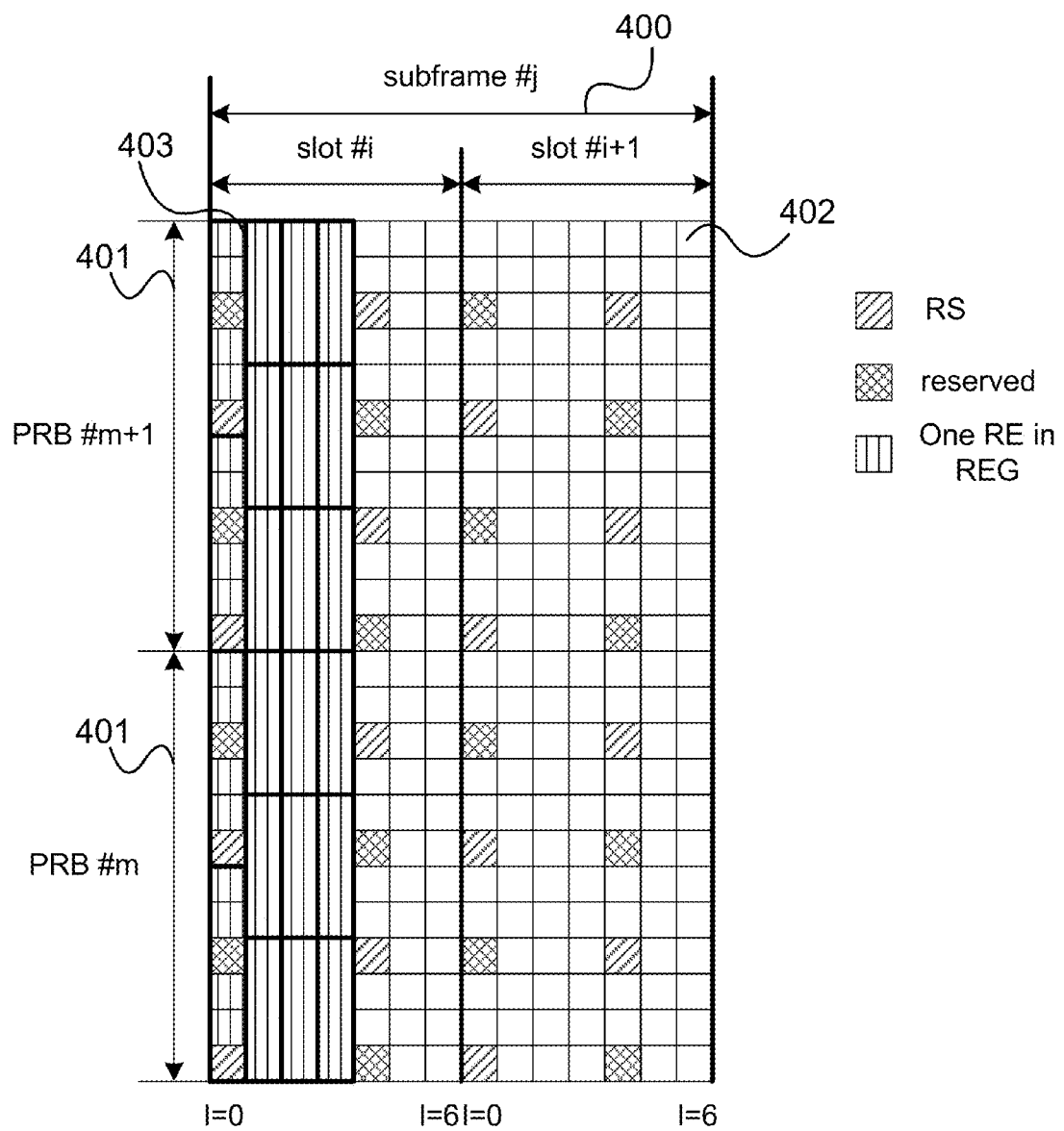
FIG. 4 shows the structure of a subframe according to an embodiment.

An exemplary resource element group structure is illustrated in FIG. 4.

FIG. 4 shows the structure of a subframe 400 according to an embodiment.

The subframe 400 is illustrated over a bandwidth size of two physical resource blocks 401 and a downlink control channel region of length four OFDMA symbols. As mentioned above, in one embodiment, a physical resource block corresponds to 12 subcarriers and 6 or 7 OFDMA symbols (in this example 7 OFDMA symbols). Thus, each square 402 in FIG. 4 may indicate one resource element which may be allocated for cell-specific reference signals (RS), may be reserved, or may be available for allocation, i.e. may be provided for transmission of a downlink control channel (if it is in the control channel region) or for the PDSCH (if it is part of the PDSCH region). In the example shown, every four resource elements in the control channel region that are available for downlink control channel data transmission are grouped to a resource element group as indicated by bold lines 403. For the first OFDMA symbol, the resource element groups also include two unavailable resource elements (being reserved or being used for reference signals).

To improve coverage and maximize frequency diversity the control channels PCFICH, PHICH and PDCCH may be equally distributed over the downlink bandwidth and mapped to their corresponding resource element groups in the following order: The PCFICH may be mapped first, then follows PHICH, and at last the PDCCH may be mapped onto the remaining resource element groups not occupied by PCFICH and PHICH.

Specifically, the PCFICH may firstly be mapped to four resource element groups equally distributed over the bandwidth in the first OFDMA symbol only. The four resource element groups are determined according to a pre-defined formula.

Secondly, PHICH may be mapped to a definite number of OFDMA symbols in time-domain (up to 3 OFDMA symbols). In frequency-domain the PHICH may be mapped to multiples of 3 resource element groups equally distributed over the bandwidth and not occupied by PCFICH. The corresponding resource element groups are determined according to a pre-defined formula.

Thirdly, PDCCH may be mapped to the definite number of OFDMA symbols as signaled on PCFICH (up to 4 OFDMA symbols). In frequency-domain the PDCCH may be mapped onto the remaining resource element groups not occupied by PCFICH and PHICH.

Multiple PDCCHs can be transmitted in a subframe in parallel for serving different mobile terminals (UEs) 105 in a radio cell 104. In detail, all PDCCHs to be transmitted in a subframe are multiplexed and each block of coded PDCCH bits is QPSK modulated and mapped on an aggregation of one or several consecutive CCEs (Control Channel Elements) that matches to the amount of coded bits, whereby a CCE corresponds to 9 resource element groups.

In Table 2 the supported CCE aggregation levels (also referred to as "PDCCH formats") are listed.

TABLE 2

Supported CCE aggregation levels

| PDCCH format | Number of CCEs | Number of REGs | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

The number of PDCCHs that can be transmitted in a subframe in parallel depends on the available number of CCEs in the cell. The number of available CCEs (denoted as $N_{CCE}$), and as result the number of available resource element groups, may depend on the mobile radio cell bandwidth and on the number of resource element groups not assigned to PCFICH or PHICH (denoted as $N_{REG}$), and is determined by the equation: $N_{CCE} = \lfloor N_{REG}/9 \rfloor$ wherein $\lfloor . \rfloor$ is used to denote floor operation.

Figure 5:
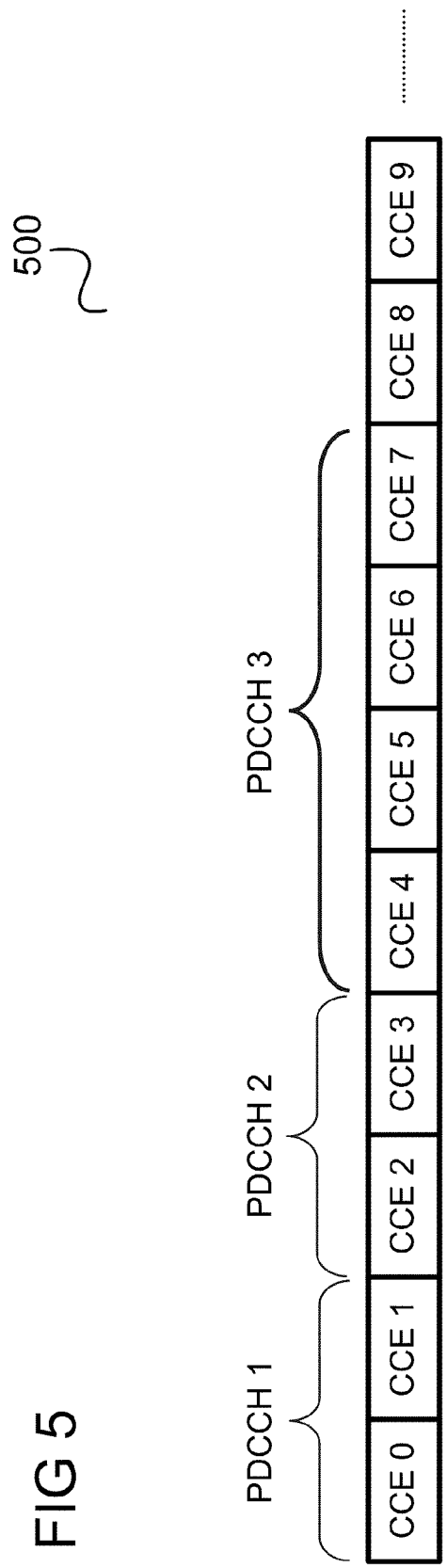
FIG. 5 illustrates an example for a mapping of different PDCCHs to CCEs.

FIG. 5 illustrates an example for a mapping of different PDCCHs to CCEs.

In FIG. 5, three PDCCHs numbered PDCCH1, PDCCH2, and PDCCH3 are illustrated, wherein PDCCH1 may be mapped to two CCEs (CCE0, CCE1), PDCCH2 is mapped to two CCEs (CCE2, CCE3), and PDCCH3 may be mapped to four CCEs (CCE4 to CCE7).

Depending on the downlink bandwidth size and amount of signaling the current structure for multiplexing and resource mapping of PDCCHs in a subframe may result in a number of resource element groups unused for downlink control channels, i.e. resource element groups not carrying any control information of the downlink control channels. The reason for this is that only resource element groups which correspond to the available number of CCEs in the mobile radio cell are taken into account for PDCCH allocation.

A current topic in 3GPP is the further advancement of LTE towards an IMT (International Mobile Communications)-Advanced radio interface technology, referred to as LTE-Advanced. The IMT-Advanced activities have been commenced and are guided by ITU-R (International Telecommunications Union—Radiocommunication Sector). In line with user trends and technology developments the key objective of the IMT-Advanced activities is to develop mobile radio communication systems that include new capabilities that go beyond those of current IMT-2000 systems such as UMTS and CDMA2000 (CDMA: Code division multiple access). Key features to be supported by candidate IMT-Advanced systems have been set by ITU-R and include amongst others:

high quality mobile services;
    worldwide roaming capability; and
    peak data rates of 100 Mbps for high mobility environments and 1 Gbps for low mobility environments.

The current discussions in 3GPP related to LTE-Advanced are focused on the technologies to further evolve LTE in terms of spectral efficiency, cell edge throughput, coverage and latency based on the agreed requirements. Candidate technologies include multi-hop Relay, uplink MIMO (multiple input multiple output) with up to (4×4) antennas, downlink MIMO with up to (8×8) antennas, Coordinated Multipoint Transmission/Reception (CoMP), support of bandwidths >20 MHz and up to 100 MHz by spectrum aggregation, flexible spectrum usage/spectrum sharing, and inter-cell interference management.

One of the key characteristics of LTE-Advanced is the support of bandwidths >20 MHz and up to 100 MHz by spectrum aggregation, i.e. the bandwidth of an LTE-Advanced (LTE-A) mobile radio cell will be composed of a number of so-called component carriers (CC), in where the bandwidth size of each component carrier is limited to a maximum of 20 MHz. The component carriers may be adjacent or non-adjacent, and in FDD mode asymmetric allocation of downlink and uplink component carriers is considered, i.e. different number of component carriers of different bandwidths in uplink and downlink. An LTE-A UE may simultaneously receive or transmit on one or multiple component carriers depending on its RF capabilities.

Further, an LTE-A radio cell is required to be backward compatible to Release 8 (Rel-8) LTE UEs with RF TX/RX capability of 20 MHz, i.e. at least one of the component carriers needs to be configured/operated Rel-8 LTE-compliantly.

Figure 6:
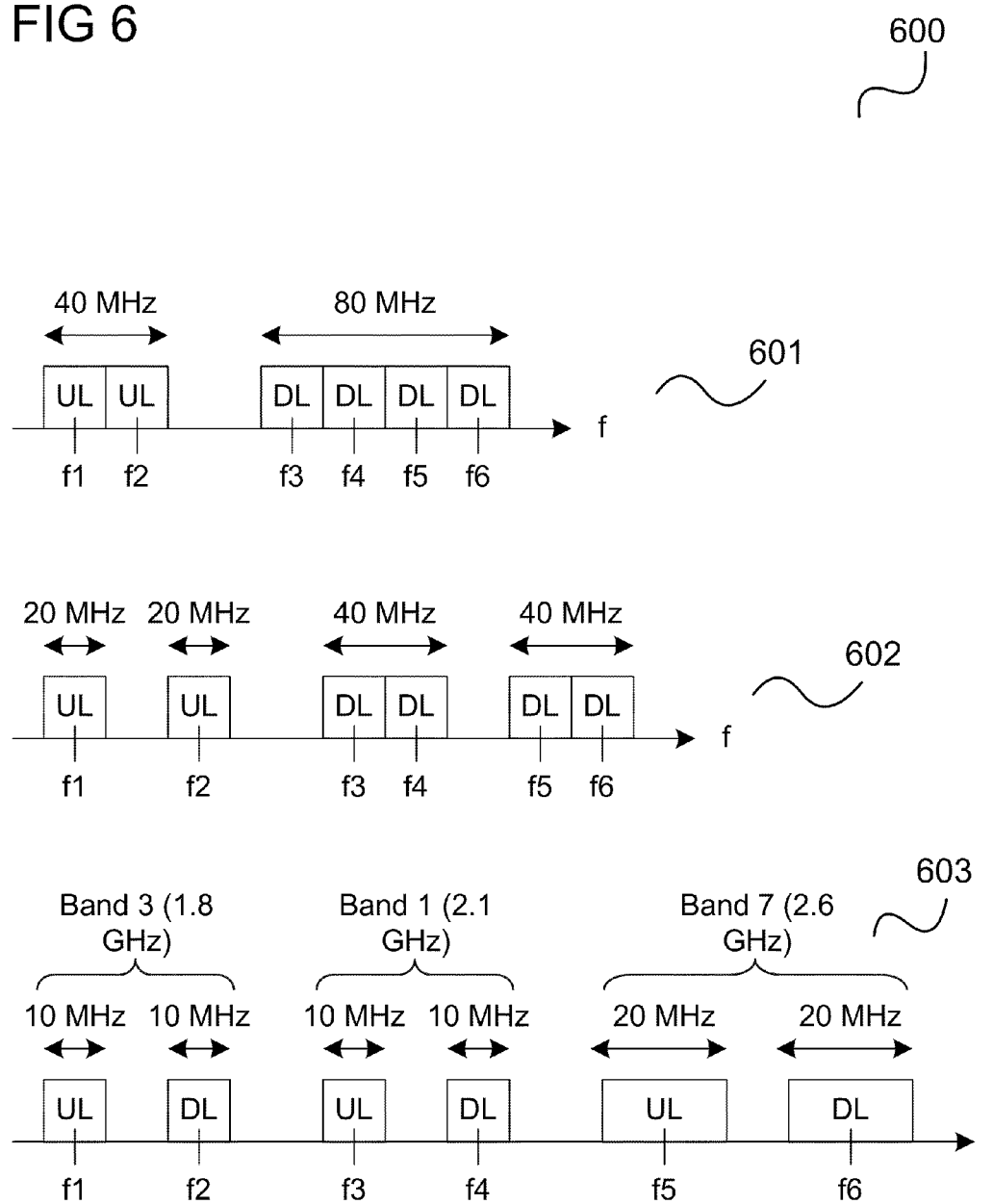
FIG. 6 shows frequency allocation diagrams.

Exemplary RF deployment scenarios according to one embodiment, in accordance with LTE-A operating in FDD mode, are illustrated in FIG. 6.

FIG. 6 shows frequency allocation diagrams 601, 602, 603.

A first frequency allocation diagram 601 shows a first scenario being a single band, contiguous and asymmetric RF deployment scenario in uplink/downlink, wherein the bandwidth size of each component carrier is 20 MHz. The uplink is composed of two adjacent component carriers characterized by the carrier frequencies f1 and f2 (i.e. 40 MHz uplink contiguous). The downlink is composed of four adjacent component carriers characterized by the carrier frequencies f3 to f6 (i.e. 80 MHz downlink contiguous).

Analogously, a second frequency allocation diagram 602 illustrates a second scenario being a Single band scenario with 80 MHz downlink (non-contiguous) and 40 MHz uplink (non-contiguous).

A third frequency allocation diagram 603 illustrates a third scenario being a multi band scenario with 40 MHz in uplink and downlink (non-contiguous).

The current status of discussions in 3GPP with regard to the configuration of component carriers and scheduling in terms of resource assignment is as follows.

Among all uplink/downlink component carriers available in the LTE-A radio cell the LTE-A UE may be configured (e.g. at connection setup via an RRC, radio resource control, message and may be re-configured during the connection) with a set of downlink and uplink component carriers on which the UE may be scheduled to receive the PDSCH in downlink and the PUSCH in uplink, respectively. These sets of component carriers are referred to as "UE DL CC set" and "UE UL CC set".

Two options may be used for downlink scheduling. This is illustrated in FIG. 7.

Figure 7:
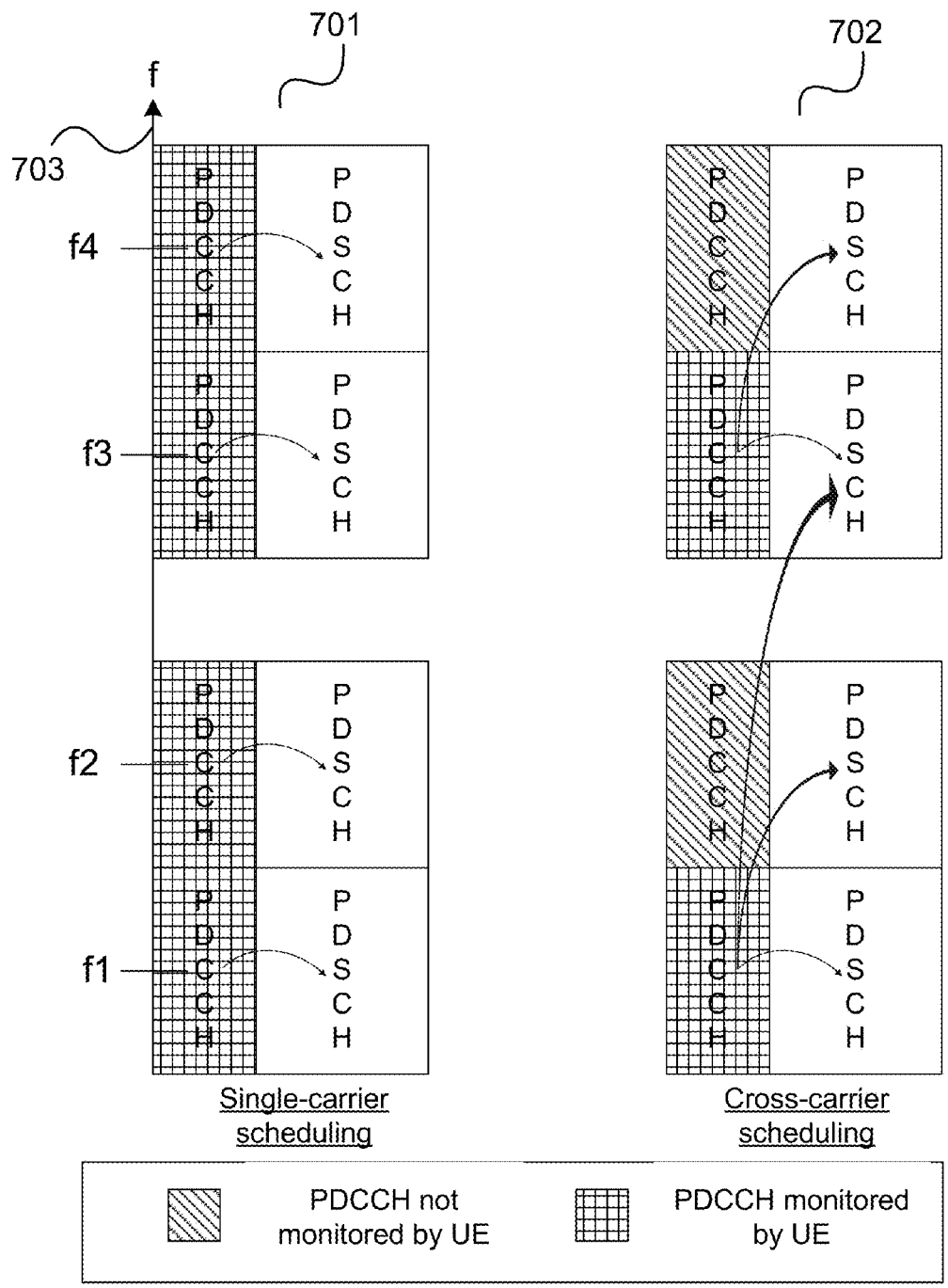
FIG. 7 illustrates downlink scheduling according to an embodiment in a first diagram and a second diagram.

FIG. 7 illustrates downlink scheduling according to an embodiment in a first diagram 701 and a second diagram 702.

The first diagram 701 illustrates single carrier scheduling. The mobile terminal 105 is provided to monitor the PDCCH on all component carriers (indicated by center frequencies f1, f2, f3, f4 along frequency axis 703) as configured by the DL CC (downlink component carrier) set, and PDSCH resources can only be assigned for the same component carrier as used for the PDCCH signalling the assignment. This option is compliant to LTE.

The second diagram 702 illustrates cross carrier scheduling. The mobile terminal 105 is provided to monitor the PDCCH on a smaller set of component carriers compared to single carrier scheduling (as indicated by the hatching). This may be configured by the DL CC set. With a PDCCH received on a certain component carrier PDSCH resources on a different component carrier can be assigned. The main benefit of cross carrier scheduling compared to single carrier scheduling may be seen in the reduction of UE decoding complexity, e.g. the number of monitored PDCCHs can be reduced.

The communication system 100 may be used for exchanging data between various communication devices, e.g. between two mobile terminals 105 or between a mobile terminal 105 and a server which is part of or connected to the core network 102.

In one embodiment, the communication system 100 may be used for machine-type communication (MTC). MTC is a topic that gained strong interest in the recent years as market growth is expected in the future. MTC refers to data communications between machines over mobile networks that do not necessarily need human interaction. Examples of MTC applications include fleet management, remote maintenance and control, and remote diagnostics.

Machine type communication can be understood to be a form of data communication which involves one or more entities that do not necessarily need human interaction.

In view of the market potential 3GPP decided to support MTC in future releases of the UMTS system, and agreed on the service requirements.

Figure 8:
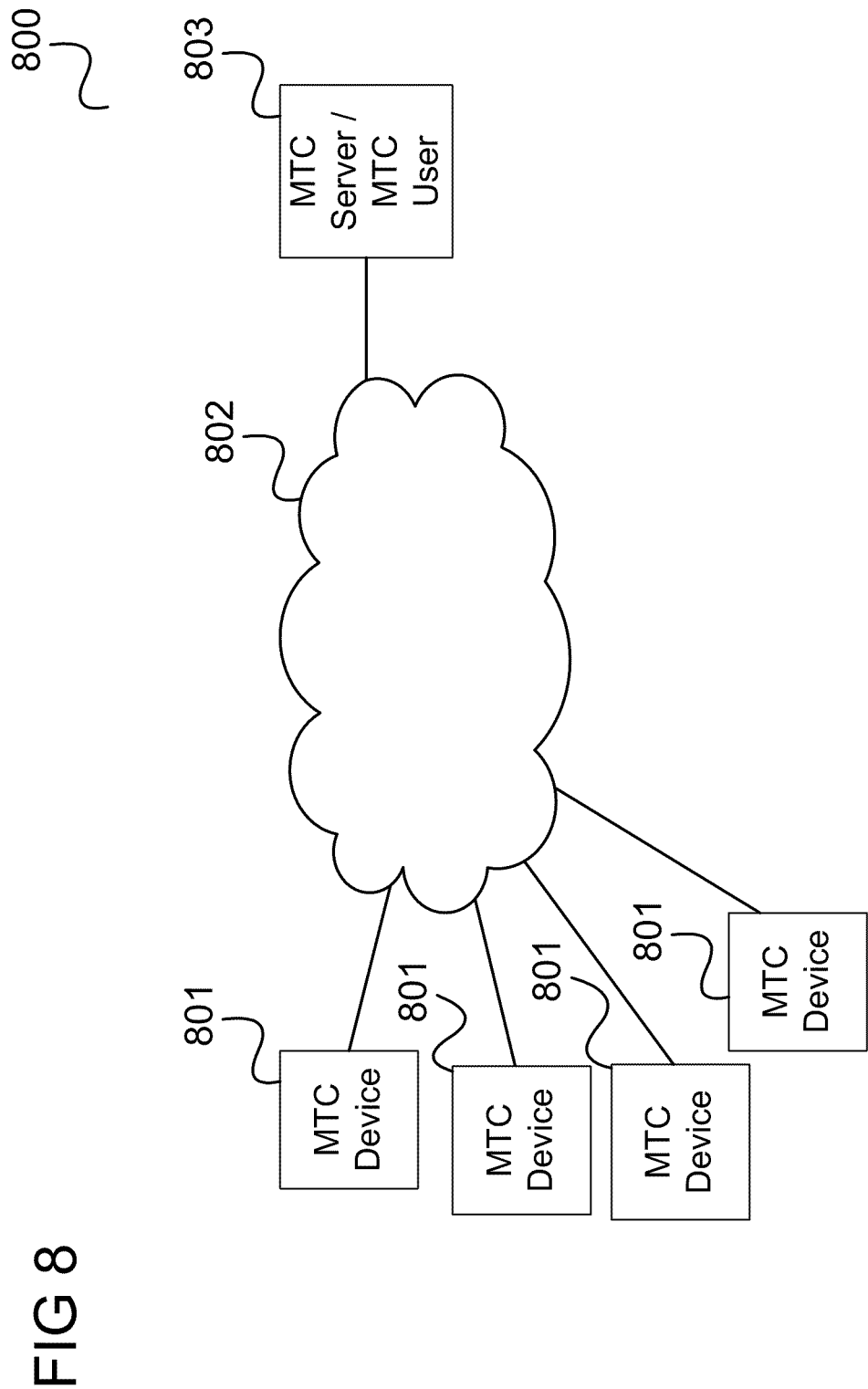
FIG. 8 shows a high-level network architecture to support MTC according to one embodiment.

FIG. 8 shows a high-level network architecture 800 to support MTC according to one embodiment.

According to the high-level network architecture 800 MTC devices 801 are provided which may be seen to correspond to mobile terminals 105 of the communication system 100 shown in FIG. 1. An MTC Device is a user equipment equipped for Machine-type communication, which communicates through a communication network, e.g. a PLMN (Public Land Mobile Network) 802, with an MTC Server. The communication network 802 may be seen to correspond to the network side of the communication system 100, i.e. the E-UTRAN 101 and the core network 102 to which the MTC Server 803 may for example be connected and may also be seen as being part of the domain of the mobile network operator.

The MTC Server is an entity which communicates to the communication network 802 itself and to MTC Devices 801 through the communication network 802. The MTC Server 803 performs services for an MTC User. The MTC server 803 may be located inside or outside the communication network 802 (e.g. may also be part of the core network 102) depending on the level of flexibility to be introduced.

An MTC User may use the service provided by the MTC Server 803.

On the 3GPP working group level, a study item on RAN Improvements for MTC has been recently approved. The objective is to study how to enable efficient use of RAN resources (UTRA/E-UTRA) for machine-type communications considering their specific requirements, the system performance impact introduced by serving a possibly very large number of MTC Devices, identify problems and propose possible solutions, and reduce the complexity of MTC. One of the requirements for MTC to be considered is the Low Data Usage, i.e. MTC shall be designed for sending or receiving only pre-defined small amounts of data, and the UMTS system shall support transmissions of small amounts of data with minimal signalling overhead.

According to one embodiment, the communication system 100, e.g. an LTE-Advanced communication system, supports machine-type communications in an efficient way. In more detail, according to one embodiment efficient transmission of MTC related data in downlink direction is described.

According to one embodiment, this transmission is not restricted to MTC related data but may also be used for other types of data.

A communication network device according to one embodiment is described in the following with reference to FIG. 9.

Figure 9:
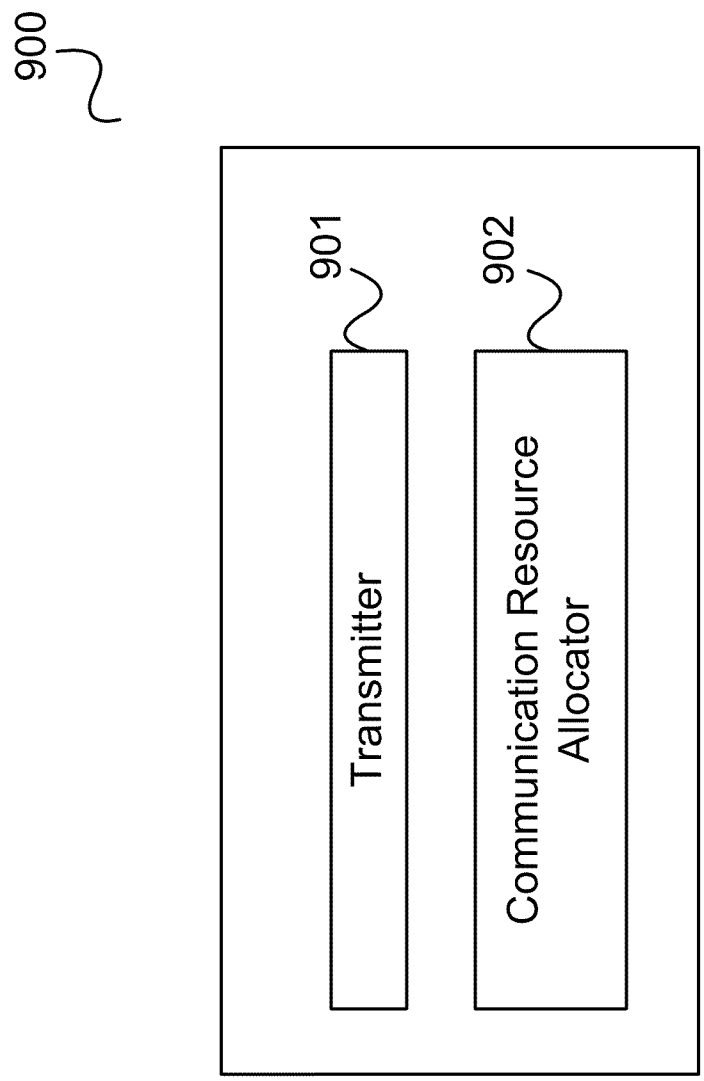
FIG. 9 shows a communication network device of a communication system according to an embodiment.

FIG. 9 shows a communication network device 900 of a communication system according to an embodiment.

The communication network device 900 includes a transmitter 901 configured to transmit data in a plurality of frames, wherein in each frame, a plurality of communication resource elements is provided to be allocated for data transmission of downlink control data, wherein a data communication resource element is defined by a frequency range and a communication time interval within the frame.

The communication network device 900 further includes a communication resource allocator 902 configured to allocate a first set of the communication resource elements of the plurality of communication resource elements provided to be allocated for data transmission of downlink control data in a frame for the transmission of the downlink control data wherein the downlink control data specify operation parameters of the communication system, and to allocate a second set of the communication resource elements of the plurality of communication resource elements provided to be allocated for data transmission of downlink control data in the frame that have not been allocated for the transmission of downlink control data for the transmission of data of another type than the downlink control data.

According to one embodiment, the data of another type than the downlink control data is data of an application layer of the communication system, i.e. application layer data.

According on one embodiment, the data of another type than the downlink control data is data exchanged between communication terminal devices of the communication system. For example, the data of another type may be exchanged between mobile communication devices or between a mobile communication device and a server that is part of or connected to the communication system. The data of another type than the downlink control data is for example MTC-related data, i.e. data transmitted to or from an MTC device, e.g. exchanged between the MTC device and a MTC server.

According to one embodiment, the downlink control data is control data of the physical layer, i.e. physical control data. The downlink control data may include scheduling data, resource allocation data (e.g. for the PDSCH) or reception of acknowledgement data such as HARQ ACK/NAK messages.

Accordingly, the operation parameters may be operational parameters specifying the operation of the physical layer of the communication network. Generally, operational parameters may be parameters specifying the behavior of the communication network with regard to data transmission, e.g. the behavior on the physical layer. The operational parameters may for example be parameters allowing a mobile terminal to receive and/or transmit from/to the communication network.

According to one embodiment, the downlink control data is data of a downlink control channel such as the PCFICH, the PHICH, and the PDCCH.

According to one embodiment, the data of another type than the downlink control data is data of a downlink data channel.

The communication network device is for example a base station or part of a base station.

According to one embodiment, the communication network device is further configured to transmit to at least one communication terminal information based on which it is derivable which communication resource elements are part of the second set of the communication resource elements. The information is for example a transmission schedule for the data of the other type. The information may for example specify the length of the frames and the periodicity of the frames (i.e. the time period between the frames) which include second sets of communication resources allocated for the transmission of the data of the other type. For example, the communication network device transmits scheduling information such as an MTC schedule as described below. In other words, according to one embodiment, MTC related data is transmitted in accordance with a transmitted MTC schedule.

In one embodiment, the transmission resource elements of the frame are grouped to a plurality of transmission resource element groups and the first set includes at least one transmission resource element group and the second set includes at least one transmission resource element group.

The communication time interval for example corresponds to the transmission of one modulation symbol.

The frequency range for example corresponds to one sub-carrier to be modulated by a modulation symbol.

The modulation symbol is for example an OFDMA modulation symbol.

In one embodiment, each frame includes a plurality of (e.g. two) subframes and each subframe includes a first region (e.g. a control channel region) including the plurality of communication resource elements and a second region (e.g. a PDSCH region) including another plurality of communication resource elements. The other plurality of communication elements may for example also be provided for allocation of other types of data than the downlink control data or may also be provided for allocation of both downlink control data and other types of data. For example, the subframe corresponds to a plurality of (possibly consecutive) communication time intervals and the first region for example corresponds to a first (possibly consecutive) part of the communication time intervals and the second region for example corresponds to a second (possibly consecutive) part of the communication time intervals. For example, the first region and the second region form the complete subframe and the communication time intervals of the second region follow the communication time intervals of the first region in time, i.e. the second region is subsequent to the first region. In other words, a first part of a subframe may be provided for downlink control data and at least a part of it (i.e. some of its resource elements) is allocated for the transmission/reception of other types of data than the downlink control data.

In one embodiment, the assignment of the plurality of communication resource elements to the first set of the communication resource elements and to the second set of the communication resource elements may dynamically change from frame to frame. In other words, in one frame, the assignment of the plurality of communication resource elements to the first set of the communication resource elements and to the second set of the communication resource elements may be different from the assignment of the plurality of communication resource elements to the first set of the communication resource elements and to the second set of the communication resource elements in a following frame, i.e. the assignment may change from frame to frame and for example be determined dynamically.

The transmitter is for example configured to transmit the data of the other type using the second set of communication resource elements.

Figure 10:
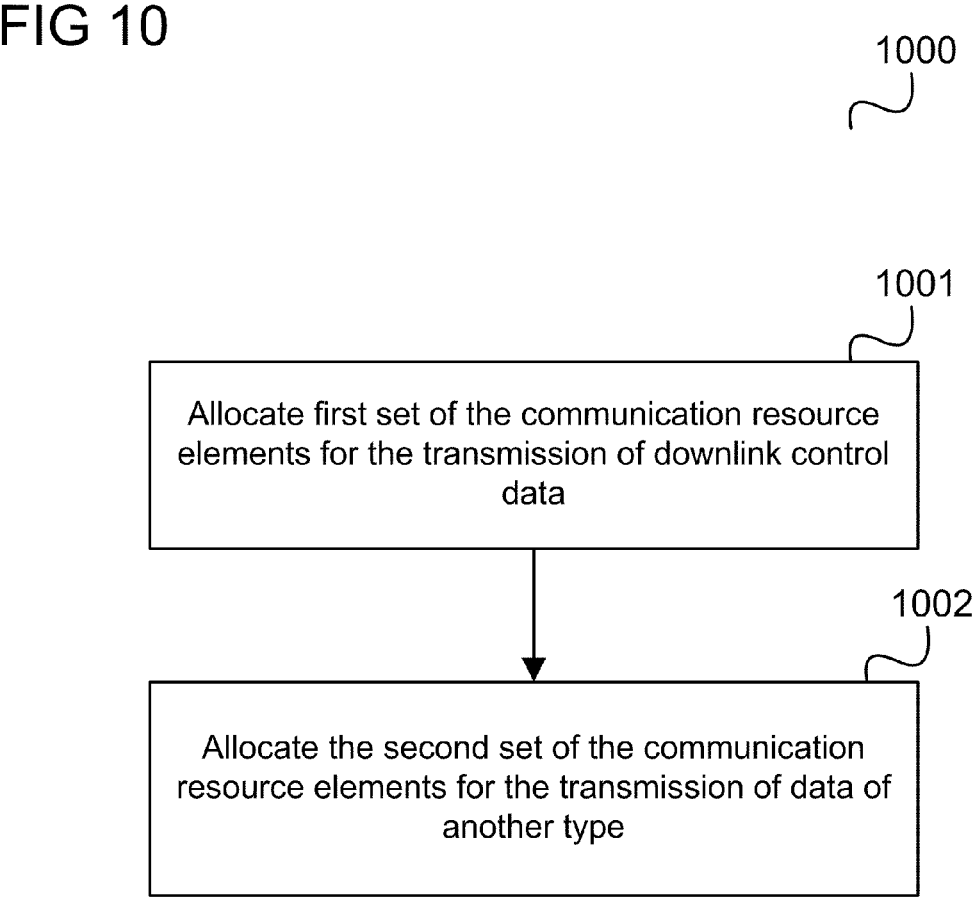
FIG. 10 shows a flow diagram according to an embodiment.

The communication network device 900 for example carries out a method as illustrated in FIG. 10.

FIG. 10 shows a flow diagram 1000 according to an embodiment.

The flow diagram 1000 illustrates a communication resource allocation method for a communication system including a transmitter configured to transmit data in a plurality of frames, wherein in each frame, a plurality of communication resource elements is provided to be allocated for data transmission of downlink control data, wherein a data communication resource element is defined by a frequency range and a communication time interval within the frame.

In 1001, a first set of the communication resource elements of the plurality of communication resource elements provided to be allocated for data transmission of downlink control data in a frame is allocated for the transmission of the downlink control data wherein the downlink control data specify operation parameters of the communication system.

In 1002, a second set of the communication resource elements of the plurality of communication resource elements provided to be allocated for data transmission of downlink control data in the frame that have not been allocated for the transmission of downlink control data is allocated for the transmission of data of another type than the downlink control data.

The communication network device 900 for example is in communication with a communication terminal as described in the following with reference to FIG. 11.

Figure 11:
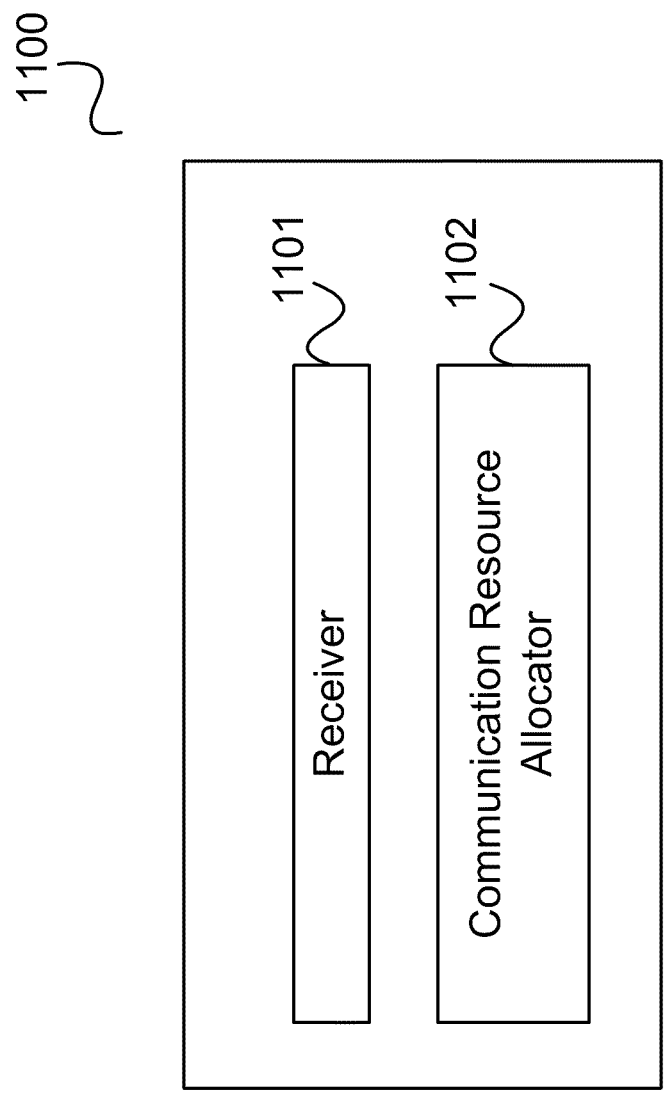
FIG. 11 shows a communication terminal of a communication system according to an embodiment.

FIG. 11 shows a communication terminal 1100 of a communication system according to an embodiment.

The communication terminal 1100 includes a receiver 1101 configured to receive data in a plurality of frames, wherein in each frame, a plurality of communication resource elements is provided to be allocated for data reception of downlink control data, wherein a communication resource element is defined by a frequency range and a communication time interval within the frame.

The communication terminal 1100 further includes a communication resource allocator 1102 configured to allocate a first set of the communication resource elements of the plurality of communication resource elements provided to be allocated for data reception of downlink control data in a frame for the reception of the downlink control data wherein the downlink control data specify operation parameters of the communication system, and to allocate a second set of the communication resource elements of the plurality of communication resource elements provided to be allocated for data reception of downlink control data in the frame that have not been allocated for the reception of downlink control data for the reception of data of another type than the downlink control data.

The communication terminal 1100 is for example a mobile terminal

According to one embodiment, the communication resource allocator is configured to determine the first set of the communication resource elements as those communication resource elements that have been allocated by a communication network device transmitting the downlink control data for the transmission of the downlink control data and the communication resource allocator is configured to determine the second set of the communication resource elements as those communication resource elements that have been allocated by the communication network device transmitting the other type of data for the transmission of the other type of data.

According to one embodiment, the communication terminal 1100 is further configured to receive from at least one communication network device information based on which it is derivable which communication resource elements are part of the second set of the communication resource elements and for example determines which communication resource elements belong to the first set and/or which communication resource element belong to the second set based on this information. The information is for example a transmission schedule for the data of the other type. The information may for example specify the length of the frames and the periodicity of the frames (i.e. the time period between the frames) which include second sets of communication resources allocated for the transmission of the data of the other type. For example, the communication terminal 1100 receives scheduling information such as an MTC schedule as described below. In other words, according to one embodiment, MTC related data is received in accordance with a received MTC schedule.

The receiver is for example configured to receive the data of the other type using the second set of communication resource elements.

Figure 12:
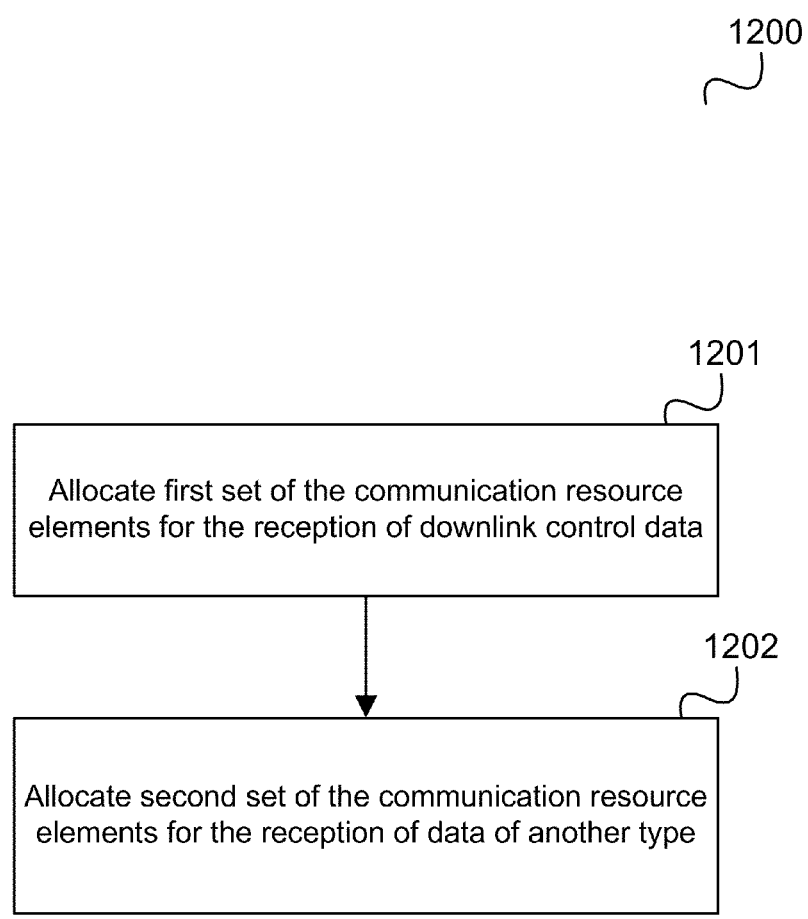
FIG. 12 shows a flow diagram according to an embodiment.

The communication terminal 1100 for example carries out a method as illustrated in FIG. 12.

FIG. 12 shows a flow diagram 1200 according to an embodiment.

The flow diagram 1200 illustrates a communication resource allocation method for a communication system including a receiver configured to receive data in a plurality of frames, wherein in each frame, a plurality of communication resource elements is provided to be allocated for data reception of downlink control data, wherein a communication resource element is defined by a frequency range and a communication time interval within the frame.

In 1201, a first set of the communication resource elements of the plurality of communication resource elements provided to be allocated for data reception of downlink control data in a frame is allocated for the reception of the downlink control data wherein the downlink control data specify operation parameters of the communication system.

In 1202, a second set of the communication resource elements of the plurality of communication resource elements provided to be allocated for data reception of downlink control data in the frame that have not been allocated for the reception of downlink control data is allocated for the reception of data of another type than the downlink control data.

According to one embodiment, illustratively, communication resources which are provided to be allocated for the transmission of downlink control data, i.e. which are reserved for the transmission of downlink control data, but which are not used for the downlink control data, e.g. due to the fact that at a given time the communication resources are not fully used for the downlink control data or due to the fact that the communication resources provided for the downlink control data are never fully used, are used for other types of data, e.g. MTC related data. The first set of communication resource elements and the second set of communication resource elements may change from frame to frame, i.e. the portion of the communication resource elements that is used for the transmission (or reception) of the data of the other type may change from frame to frame. In other words, according to one embodiment, there is a dynamic allocation of the communication resource elements to transmission or reception of downlink control data and data of the other type, respectively. For example, the portion of the communication resource elements that is used for the transmission (or reception) of downlink control data may decrease when the number of mobile terminals in the respective radio cell decreases and accordingly, the portion of the communication resource elements that can and is used for the transmission (or reception) of the data of the other type increases or vice versa.

In an embodiment, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with an alternative embodiment.

It should be noted that embodiments described in context with the communication network device are analogously valid for the communication terminal and the communication resource allocation methods and vice versa.

The downlink control data may for example be data of the PCFICH, the PHICH, and the PDCCH. This means that the communication network device is for example part of an LTE-A communication system, e.g. of the E-UTRAN and resource elements or resource element groups that are unused by the downlink control channels are used for transmission of other types of data, e.g. MTC related data or other data to be exchanged between communication terminals or user devices such as between mobile terminals or a mobile terminal and a server. For example, the transmitted data may be user data or data of the application layer or data related to certain communication services such as SMS (Short Message Service) message data, CBS (Cell Broadcast Service) message data or similar data.

An embodiment in which the communication network device is part of an LTE-A communication system may be seen to be based on a usage of resource element groups unused for downlink control channel data in the control channel region as explained above with reference to FIG. 4 and FIG. 5. The lack of usage of the resource element groups for the downlink control channels in the control channel region in an LTE-A communication system can be seen as a system-immanent issue and one embodiment may be seen to be based on avoiding the waste of these communication resources.

This effect is even greater in an LTE-Advanced system when cross-carrier scheduling is performed as explained above with reference to FIG. 7, i.e. when a PDCCH transmitted on a component carrier is used to assign PDSCH resources on multiple component carriers since this may lead to an even higher number of resource element groups being unused in the control channel region in one component carrier since the scheduling information may be transmitted using a different component carrier.

One embodiment may thus be seen to allow avoiding a waste of resource element groups non-used for downlink control channel data by using these resource element groups for data transmission for communication services requiring only small amounts of data with minimal signaling overhead. As mentioned above such a communication service may be Machine-type communication (MTC), a topic that gained strong interest in the recent years as market growth is expected in the future. Machine-type communication refers to data communications between machines over mobile networks that do not necessarily need human interaction. For example, a machine-type communication may be a communication that does not involve data generated by human users, e.g. does not include human speech data but includes only data automatically generated by machines, e.g. data generated without interaction of a human user. MTC devices may for example be devices having low mobility, e.g. terminals that are located in stationary machines such as vending machines etc.

One embodiment may be seen to allow a support of Machine-type communications in LTE-Advanced communication systems including an efficient transmission of MTC related data in downlink direction, i.e. from the communication network (e.g. including the E-UTRAN 101 and the core network 102) to a mobile terminal 105 which is in this case a MTC device.

Such an embodiment may for example have the following features which are described in the following with reference to the MTC network architecture shown in FIG. 8.

The MTC related data are mapped and transmitted on the non-used resource element groups in the downlink control channel region. For each defined MTC related identifier (M-RNTI) the communication network 802 (e.g. a component of the E-UTRAN 101) configures an MTC schedule including the following information:

A resource element group aggregation level for each component carrier that is configured to carry MTC related data, i.e. set of consecutive radio frames on which the MTC related data are mapped and transmitted on the non-used resource element groups in the downlink control channel region. Based on a pre-defined formula an MTC Device 801 (e.g. corresponding to the mobile terminal 105) determines the effective number of non-used resource element groups of the signaled resource element group aggregation level and collects them for decoding the received MTC related data. Further, depending on the downlink control channel region length configured for each component carrier the number of the non-used resource element groups in the downlink control channel region may vary from component carrier to component carrier. Generally, scheduling information for the MTC related data (or generally the other type of data, i.e. the data of the other type) may include a specification of a number of frames for which resource elements of the plurality of resource elements are allocated for the transmission/reception for the MTC related data (or generally the other type of data).

Start radio frame number of the resource element group aggregation level with value range [0, . . . , 1023].

Periodicity of the resource element group aggregation level, i.e. a specification of periodically occurring time instants at which the MTC related data (or generally the other type of data) may be transmitted. Exemplary values can be in the range [1, 2, 4, 8, 16, 24] in hours.

Further, the network 802, i.e. a network communication device, e.g. a component of the E-UTRAN 101, signals the MTC schedule to one or more of the MTC Devices 801 e.g via system information or via dedicated signaling. Both types of signaling may for example be mapped on the PDSCH.

Figure 13:
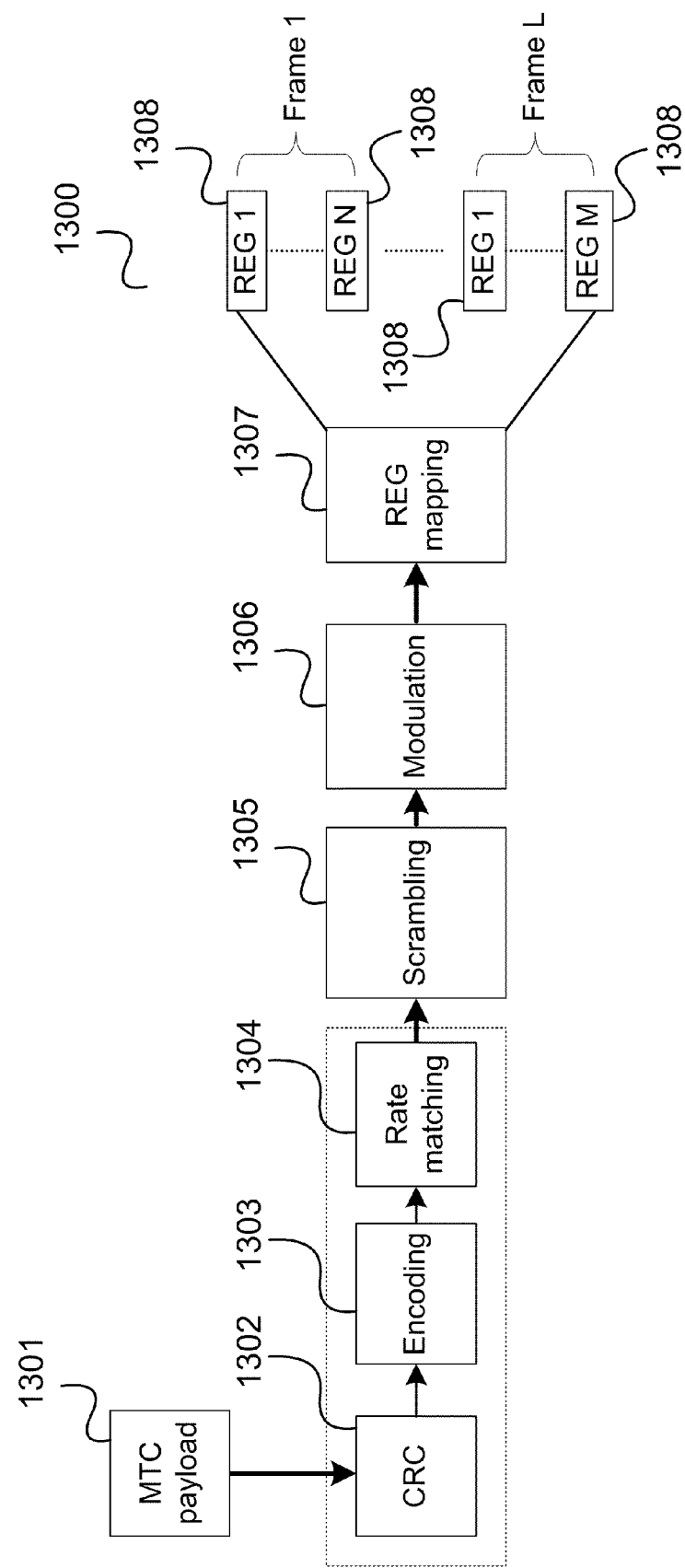
FIG. 13 shows a communication network device according to an embodiment.

In this embodiment, the communication network device 900 may for example have the structure as illustrated in FIG. 13.

FIG. 13 shows a communication network device 1300 according to an embodiment.

The components of the communication network device 1300 may be seen to reflect the signal processing chain for transmission of MTC related data (MTC payload) 1301. The signal processing chain on the respective receiver side may be a corresponding signal processing chain.

The communication network device 1300 includes a CRC (cyclic redundancy check) circuit 1302, a convolutional encoder 1303, and a rate matching circuit 1304 which can be seen to be part of the channel coding part of the communication network device 1300.

In the CRC circuit 1302 parity bits (e.g. 16 bits) are attached to the MTC payload 1301 for error detection. The CRC parity bits are scrambled with the corresponding M-RNTI (MTC Radio Network Temporary Identifier) for identification of the received MTC related data at the respective MTC device 801. MTC payload and CRC parity bits are encoded by the convolutional encoder 1303 with a rate 1/3 for error correction. The coded bits are then rate-matched according to the available number of resource element groups as signalled by resource element group aggregation level by the rate matching circuit 1304.

The communication network device 1300 further includes a scrambling circuit 1305 which applies cell-specific scrambling to the coded bits for identifying the cell transmitting the MTC related data.

Further, the communication network device 1300 includes a modulation circuit 1306 which modulates the scrambled bit sequence according to QPSK wherein every two bits each are mapped to one QPSK symbol.

The modulation symbols are then mapped to the resource element groups 1308 according to the signalled resource element group aggregation level by a mapping circuit 1307.

The embodiment described above allows supporting Machine-type communications in an LTE-Advanced communication system in a resource efficient way. Furthermore, downlink radio resources in an LTE-Advanced radio cell are efficiently used for machine-type communications by using resources in the downlink control channel region that are not used for transmitting data of the downlink control channels.

An example for a mapping of MTC-related data to resource element groups of the control channel region or, in other words, an allocation of resource element groups of the control channel region for transmission (or from the point of view of the receiving MTC device for reception) of MTC-related data is given in the following for a better understanding of the embodiment described above.

The following configuration is considered for the following example.

The communication network 802 is assumed to be an LTE-Advanced network based on OFDMA/TDMA in downlink, SC-FDMA/TDMA in uplink, and operating in FDD mode.

MTC devices are located in an LTE-Advanced radio cell configured such that there is one component carrier usable in uplink and downlink with a downlink bandwidth size of 1.4 MHz, normal CP (cyclic prefix) length and a single antenna.

Figure 14:
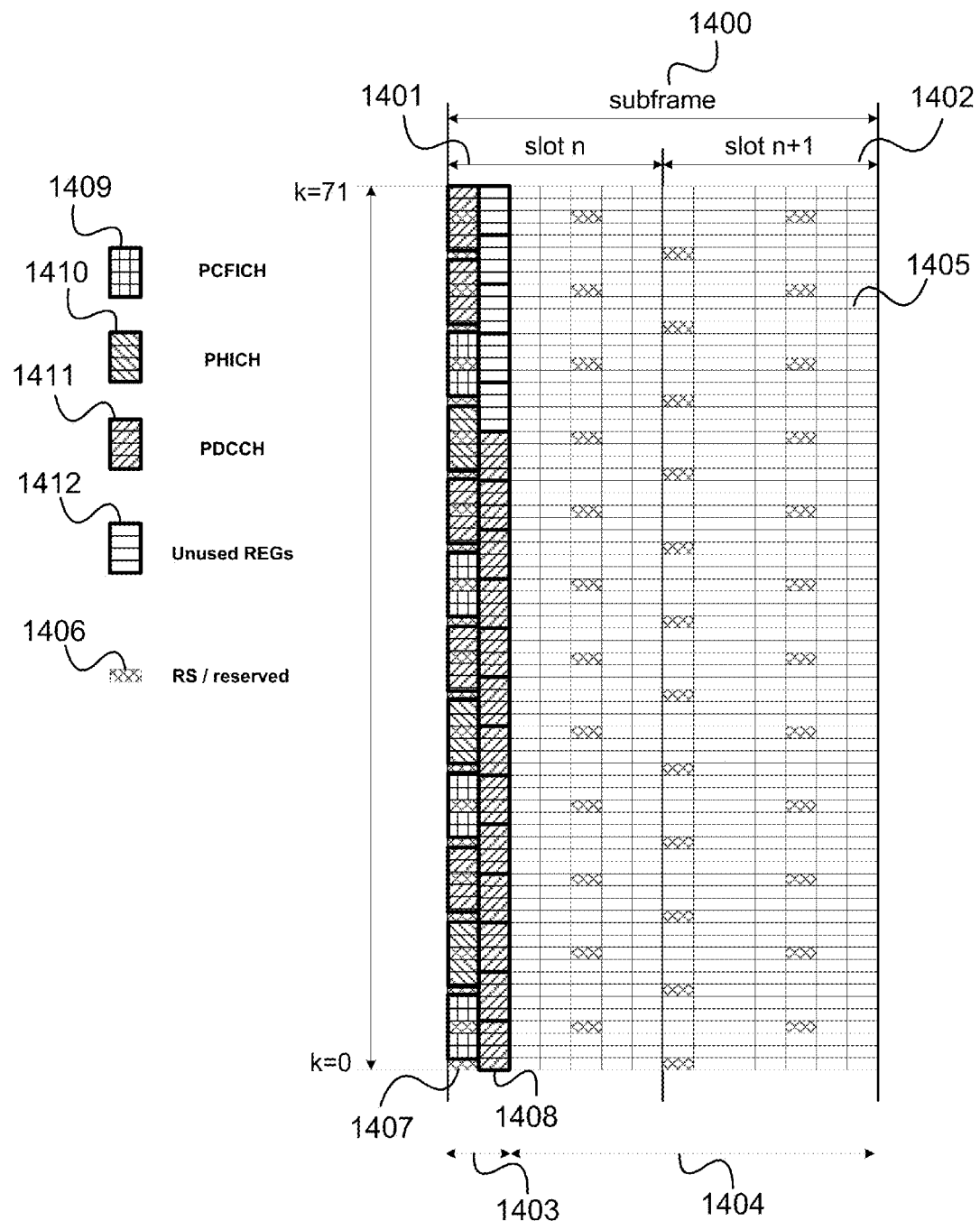
FIG. 14 shows an allocation of a subframe according to an embodiment.

The subframe structure used in this example is illustrated in FIG. 14 and will be described in the following.

FIG. 14 shows an allocation of a subframe 1400 according to an embodiment.

The subframe 1400 includes, as described with reference to FIG. 2, a first time slot 1401 and a second time slot 1402.

The subframe 1400 is separated into a control channel region 1403 which occupies two OFDMA symbols in this example and a PDSCH region 1404 which occupies the remaining 12 OFDMA symbols in this example. Each little rectangle 1405 shown in FIG. 14 corresponds to a combination of one OFDMA symbol with one of 72 sub-carriers (numbered from k=0 to k=71), i.e. corresponds to one resource element. As indicated by a first hatching 1406, some resource elements are unavailable for allocation e.g. being used for reference signals (RS) or being reserved.

In accordance with the values given in table 1, in the control channel region, 12 resource element groups are available in the first OFDMA symbol, and 18 resource element groups are available in the second OFDMA symbol. The resource element groups are indicated by bold lines wherein in the first OFDMA symbol 1407 of the subframe 1400 the resource element groups are shown such that they include one unavailable resource element (due to e.g. being used for a RS). The resource elements groups of the first OFDMA symbol 1407 may also be defined to include two unavailable resource elements (e.g. two resource elements for RS) each.

In this example, the PCFICH is mapped to 4 resource element groups equally distributed over the bandwidth in the first OFDMA symbol 1407 as indicated by a second hatching 1409.

PHICH is mapped to 3 resource element groups equally distributed over the bandwidth in the first OFDMA symbol 1407 as indicated by third hatching 1410.

PDCCH can be mapped to the remaining 23 resource element groups (=$N_{REG}$) of the first OFDMA symbol 1407 and the second OFDMA symbol 1408, but according to the equation: $N_{CCE}=\lfloor N_{REG}/9 \rfloor$ only 18 resource element groups are effectively used for PDCCH transmission as indicated by a fourth hatching 1411. As result, there are 5 resource element groups non-used for downlink control data per subframe as indicated by the blank resource element groups 1412.

In this example, these non-used resource element groups are used for transmission of MTC related data from the MTC Server 803 to the MTC Devices 801 located in the LTE-Advanced radio cell. All of these MTC Devices 801 are assigned with the same M-RNTI in this example. For transmission of a MTC payload of 240 bits within 20 ms (=2 radio frames), which corresponds to a bit rate of 12 kbps, the communication network 802 signals an MTC schedule to the MTC Devices 801 via system information. In this example, the MTC schedule includes the following information:

resource element group aggregation level: L=2 consecutive radio frames. This value implies the use of 100 resource element groups (and thus 400 resource elements in this example).

Start radio frame number of the resource element group aggregation level: 5. This implies that the radio frames #5 and #6 carry the MTC related data in this example.

Periodicity of the resource element group aggregation level: 4 hours.

Referring to the configured MTC schedule an LTE-Advanced eNB of the communication network 802 transmits an MTC payload of 240 bits on two consecutive radio frames #5 and #6 every 4 hours to all MTC Devices located in the cell. The signal processing chain for transmission of the MTC related data corresponds for example to the processing carried out by the communication network device described with reference to FIG. 13. In this example 16 CRC parity bits are attached to the MTC payload of 240 bits for error detection in the CRC circuit 1302. The CRC parity bits are scrambled with the M-RNTI for identification of the received MTC related data at each MTC Device. MTC payload and CRC parity bits (=256) are encoded by the convolutional encoder 1303 with rate 1/3 for error correction. The resulting coded bits of 768 bits are then rate-matched to 800 bits according to the available number of resource element groups as signalled by resource element group aggregation level. After mobile radio cell-specific scrambling by the scrambling circuit 1305 and QSPK modulation the 100 modulation symbols are then mapped to the 100 resource element groups and transmitted to the MTC Devices.

At the receiving side each MTC Device 801 determines the 5 resource element groups per subframe not used for downlink control data in the radio frames #5 and #6 according to the signalled MTC schedule and equation: $N_{CCE} = \lfloor N_{REG}/9 \rfloor$. Further, each MTC Device 801 processes the received MTC related data according to the signal processing chain corresponding to the one of the communication network device 1300 described with reference to FIG. 13 in order obtain the transmitted MTC payload.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A communication network device of a communication system comprising:
   a transmitter to transmit data in a plurality of frames, wherein in each frame, a plurality of resource element groups (REGs) are allocated for transmission of downlink (DL) control information that specifies operation parameters of the communication system, wherein a resource element in an REG is defined by a frequency range and a communication time interval within the frame; and
   a communication resource allocator to:
      allocate a first REG in the plurality of allocated REGs for transmission of the DL control information;
      identify a second REG in the plurality of REGs that were previously allocated for transmission of control information, wherein the second REG is different than the first REG and the second REG is unused for the transmission of the DL control information; and
      allocate, the second REG of the plurality of allocated REGs for the transmission of machine-type communication (MTC) data.

2. The communication network device of claim 1, wherein the MTC data is data of an application layer of the communication system.

3. The communication network device of claim 1, wherein the MTC data is data exchanged between communication terminal devices of the communication system.

4. The communication network device of claim 1, wherein the DL control data is control data of the physical layer.

5. The communication network device of claim 1, wherein the DL control data is data of a DL control channel.

6. The communication network device of claim 1, wherein the MTC data is data of a DL data channel.

7. The communication network device of claim 1, wherein the communication network device is an evolved NodeB (eNB).

8. The communication network device of claim 1, wherein the transmitter is further to transmit to at least one communication terminal information based on which it is derivable which resource elements in the frame include the MTC data.

9. The communication network device of claim 8, wherein the information includes a REG aggregation level, a start radio frame number of the REG aggregation level, or a periodicity of the REG aggregation level.

10. The communication network device of claim 1, wherein the transmitter is further to transmit MTC data on resource elements of the second REG.

11. The communication network device of claim 1, wherein the communication time interval corresponds to the transmission of one modulation symbol.

12. The communication network device of claim 1, wherein the frequency range corresponds to one sub-carrier to be modulated by a modulation symbol.

13. The communication network device of claim 12, wherein the modulation symbol is an orthogonal frequency-division multiple access (OFDMA) modulation symbol.

14. The communication network device of claim 1, wherein the frame is a first frame and resource elements in the first REG and the second REG of the frame may be different than resources elements in a third REG and a fourth REG in a second frame that is different than the frame, wherein the third REG corresponds to the first REG and the fourth REG corresponds to the second REG.

15. A communication resource allocation method comprising:
   identifying, by an evolved NodeB (eNB), a plurality of resource element groups (REGs) that may be used by the eNB for transmission of downlink (DL) control information that specifies operation parameters of the communication system, wherein a resource element in a REG is defined by a frequency range and a communication time interval within the frame;
   mapping, by the eNB, a first REG in the plurality of REGs for transmission of the DL control information;
   identifying, by the eNB after the mapping of the first REG, a second REG in the plurality of REGs that were previously allocated for transmission of control information, wherein the second REG is different than the first REG and the second REG is unused for the transmission of the DL control information; and
   mapping, by the eNB, the second REG of the plurality of allocated REGs for the transmission of machine-type communication (MTC) data.

16. A user equipment (UE) of a communication system comprising:
   a receiver to receive data in a plurality of frames, wherein in each frame, a plurality of resource element groups (REGs) are allocated for reception of downlink (DL) control information that specifies operation parameters of the communication system, wherein a resource element in an REG is defined by a frequency range and a communication time interval within the frame; and
   a communication resource allocator to:
      allocate a first REG in the plurality of allocated REGs for reception of the DL control information;
      identify a second REG in the plurality of REGs that were previously allocated for transmission of control information, wherein the second REG is different than the first REG and the second REG is unused for the transmission of the DL control information; and
      allocate the second REG of the plurality of allocated REGs for the reception of machine-type communication (MTC) data.

17. The UE of claim 16, wherein the communication resource allocator is to determine the first REG as those resource elements that have been allocated by an evolved NodeB (eNB) transmitting the DL control information for the transmission of the downlink control information; and
   wherein the communication resource allocator is further to determine the second REG as those resource elements that have been allocated by the eNB for the transmission of the MTC data.

18. The UE of claim 16, wherein the receiver is further to receive from an evolved NodeB (eNB) information based on which it is derivable which resource elements include the MTC data.

19. The UE of claim 18, wherein the information includes a REG aggregation level, a start radio frame number of the REG aggregation level, or a periodicity of the REG aggregation level.

20. The UE of claim 16, wherein the receiver is to receive the MTC data on the second REG.

21. A communication resource allocation method comprising:
- identifying, by a user equipment (UE), a plurality of resource element groups (REGs) that may be used by the UE for reception of downlink (DL) control information that specifies operation parameters of the communication system, wherein a resource element in a REG is defined by a frequency range and a communication time interval within the frame, the method comprising;
- mapping, by the UE, a first REG in the plurality of allocated REGs for reception of DL control information;
- identifying, by the UE after the mapping of the first REG, a second REG in the plurality of REGs that were previously allocated for transmission of control information, wherein the second REG is different than the first REG and the second REG is unused for the transmission of the DL control information; and
- mapping, by the UE, the second REG of the plurality of allocated REGs for the reception of machine-type communication (MTC) data.

* * * * *